(12) United States Patent
Junker

(10) Patent No.: US 10,092,994 B2
(45) Date of Patent: Oct. 9, 2018

(54) GRINDING MACHINE WITH PIVOTABLE MOUNTING OF A GRINDING SPINDLE

(75) Inventor: Erwin Junker, Buehl (DE)

(73) Assignee: Erwin Junker Maschinenfabrik GmbH, Nordrach (DE)

( * ) Notice: Subject to any disclaimer, the term of this patent is extended or adjusted under 35 U.S.C. 154(b) by 1356 days.

(21) Appl. No.: 14/005,704

(22) PCT Filed: Mar. 16, 2012

(86) PCT No.: PCT/EP2012/054687
§ 371 (c)(1),
(2), (4) Date: Dec. 9, 2013

(87) PCT Pub. No.: WO2012/126840
PCT Pub. Date: Sep. 27, 2012

(65) Prior Publication Data
US 2014/0302751 A1 Oct. 9, 2014

(30) Foreign Application Priority Data
Mar. 24, 2011 (DE) .......................... 10 2011 014 987

(51) Int. Cl.
*B23Q 1/36* (2006.01)
*B24B 41/04* (2006.01)
(Continued)

(52) U.S. Cl.
CPC ................ *B24B 41/04* (2013.01); *B23Q 1/34* (2013.01); *B23Q 1/36* (2013.01); *B24B 5/42* (2013.01); *B23Q 2210/002* (2013.01)

(58) Field of Classification Search
CPC ......... B24B 13/02; B24B 37/30; B24B 41/04; B24D 7/16; B24D 11/001; Y10T 409/309352
(Continued)

(56) References Cited

U.S. PATENT DOCUMENTS 4,709,508 A 12/1987 Junker
4,817,338 A * 4/1989 Zang ....................... B24B 3/021
451/141
(Continued)

FOREIGN PATENT DOCUMENTS

DE           810 954 C     8/1951
DE        34 35 313 C2   9/1985
(Continued)

OTHER PUBLICATIONS

Translation of Foreign Patent DE 4143162 A1.*
(Continued)

*Primary Examiner* — Monica Carter
*Assistant Examiner* — Lauren Beronja
(74) *Attorney, Agent, or Firm* — Marshall, Gerstein & Borun LLP

(57) ABSTRACT

The housing of a grinding spindle unit is pivotably mounted by way of a pivot axle on the receiving part of a grinding machine, e.g., on a grinding headstock. The grinding spindle unit bears a grinding wheel which is driven in rotation. The actuation of an adjusting unit extends a pressure pin, which pivots the housing of the grinding spindle unit about the pivot axle and thus slants the grinding wheel. The pivot axle is in this case formed as a film hinge through a zone of targeted elastic material deformation. A tensile spring device brings about constant contact between the pressure pin and the receiving part.

14 Claims, 9 Drawing Sheets

(51) Int. Cl.
   *B23Q 1/34*   (2006.01)
   *B24B 5/42*   (2006.01)
(58) Field of Classification Search
   USPC .................................. 451/5, 8, 9, 10, 360
   See application file for complete search history.

(56) References Cited

U.S. PATENT DOCUMENTS

| | | | | |
|---|---|---|---|---|
| 5,681,208 A | * | 10/1997 | Junker | B23B 31/22 |
| | | | | 451/381 |
| 6,234,885 B1 | * | 5/2001 | Haferkorn | B24B 5/16 |
| | | | | 451/121 |
| 2008/0305724 A1 | * | 12/2008 | Kitatsuji | B24B 9/005 |
| | | | | 451/282 |
| 2012/0279286 A1 | * | 11/2012 | Haimer | G01M 1/02 |
| | | | | 73/66 |

FOREIGN PATENT DOCUMENTS

| | | |
|---|---|---|
| DE | 41 43 162 A1 | 7/1993 |
| DE | 297 21 000 U1 | 2/1998 |
| DE | 102 35 808 A1 | 2/2004 |
| DE | 103 55 493 A1 | 7/2005 |
| EP | 1 175 960 A2 | 1/2002 |
| WO | WO-2008/075020 A1 | 6/2008 |

OTHER PUBLICATIONS

International Search Report for Application No. PCT/EP2012/054687 dated Jun. 4, 2012.

German Office Action for Application No. 10 2011 014 987.2 dated Oct. 25, 2011.

\* cited by examiner

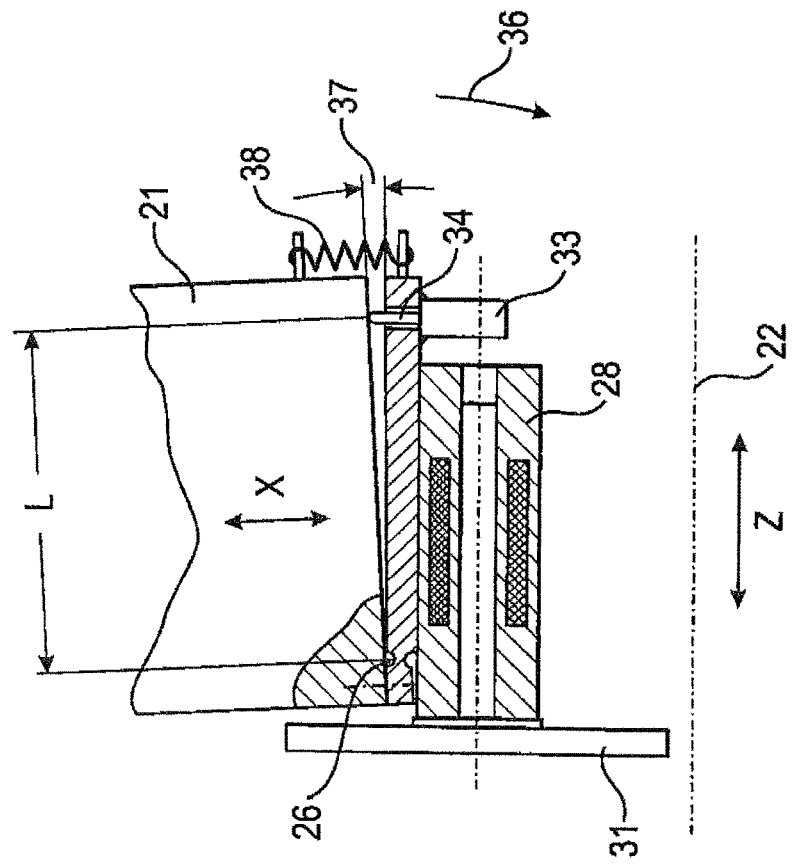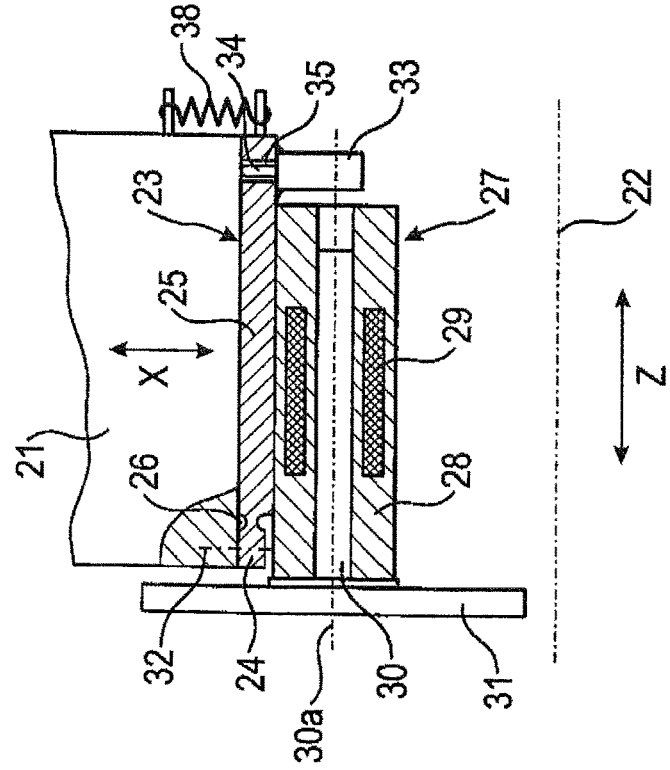

GRINDING MACHINE WITH PIVOTABLE MOUNTING OF A GRINDING SPINDLE

CROSS-REFERENCE TO RELATED APPLICATIONS

This is the U.S. National Stage of International Patent Application No. PCT/EP2012/054687, which has an international filing date of Mar. 16, 2012, and claims priority benefit of German patent application no. 10 2011 014 987.2, filed Mar. 24, 2011. The entire contents of each of the foregoing are hereby incorporated herein by reference.

BACKGROUND

The present disclosure relates to a grinding machine device with a grinding spindle unit, which has a motor-driven drive shaft mounted therein and a grinding wheel fastened to one end thereof, and with a pivotable mounting of the grinding spindle unit on a receiving part of the grinding machine, wherein, due to the pivotable mounting, different inclinations of the drive shaft with respect to a reference line are set.

The present disclosure also relates to a method for pivoting a grinding spindle unit, which is connected via at least one pivot axis to a receiving part of a grinding machine and has a motor-driven drive shaft and also a grinding wheel fastened to one end thereof, whereby, as the grinding spindle unit is pivoted, different inclinations of the drive shaft with respect to a reference line are set.

According to the prior art, the pivotable mounting of grinding spindle units of this type located on the grinding machine consists in the fact that the grinding spindle unit is pivoted together with the receiving part as a whole, that is to say with its entire housing and the respective drive motor, in a motor-driven manner about a pivot axis with respect to the rest of the grinding machine. Here, the pivot axis is formed as a conventional pivot axis within the context of mechanical engineering. In other words, the pivot axis can be formed structurally specifically in the form of a bearing shaft or can be defined geometrically exactly by the center axis of mounts in which the entire grinding spindle unit is mounted. By pivoting the grinding spindle unit, the grinding wheel thereof can be leaned against the workpiece at different angles, and different grinding wheels can also be used if a plurality of grinding spindles are attached to a pivotable receiving part of the grinding machine.

With the known design of round/unround universal grinding machines, the pivot axis of the pivotable grinding spindle units is often referred to by practitioners as the B-axis. The B-axis is preferably directed perpendicular to the drive shaft of the grinding spindle unit and is also arranged perpendicular to the plane given by the possible linear axes of displacement of the grinding wheel and/or workpiece, wherein these axes of displacement are referred to in practice as the X-axis and Z-axis. The aforementioned plane most commonly runs horizontally, such that the B-axis is directed vertically. According to the prior art, a motor actuator is normally used to pivot the grinding spindle unit, the control of said motor actuator being incorporated into the control and regulation device of the grinding machine as a whole. An example of the prior art described here is presented in DE 102 35 808 A1.

With these known devices for pivoting grinding spindle units, large pivots paths can be provided and numerous grinding tasks can be performed with a high level of accuracy. For example, the inclination of the grinding wheel can be changed constantly during running operation by means of the CNC control, wherein a movement in one or more linear movement directions is also performed simultaneously. Complex curved and/or inclined contours can thus be produced with a high level of accuracy and high surface quality. However, there are borderline cases in which the grinding machines with the grinding spindle units pivotable in the conventional manner no longer provide satisfactory results.

A borderline case of this type is the grinding of bearings that are located on shafts and that are to have a "contour" that deviates from the cylinder shape. This contour may consist of a slightly outwardly curved spherical contour, which is referred to by practitioners as a "ballus". When mounting crankshafts for example, the deviation from the cylinder shape outwardly is in a range from 0 to 5 μm. With other shafts, such as camshafts, conical bearings or cams, that is to say the contour of a cone, may also be requested, as well as the contour of a double cone with a maximum in the axial center. Contours of this type can be produced economically, particularly with inclined grinding wheels.

Often, a cylinder correction has to be made on the workpieces to be ground because clamping errors are present. This problem occurs particularly in the case of large crankshafts, which are relatively soft structures and with which, in spite of all precautions taken after the clamping the shaft for grinding, not all main bearings run exactly in line with the relevant longitudinal axis of the crankshaft. Errors of this type have to be counteracted during the grinding process by a deliberately controlled correction deviation from the normal position. In these and similar applications, it is necessary for the longitudinal and rotation axis of the grinding wheel to be pivoted with a high level of accuracy by a very small angle with respect to the reference line. Here, the reference line is normally the longitudinal and rotation axis of the grinding wheel when this runs exactly parallel to the center line of a rotating workpiece to be ground.

Another case in which an inclination of the grinding wheel by a small, yet precisely set angle with respect to the workpiece is necessary concerns the external cylindrical grinding of rotationally symmetrical workpieces, wherein a cylindrically trued grinding wheel is guided with a small clearance angle against the workpiece surface to be machined and the grinding wheel bearing against the workpiece at the end face contacts the finished ground workpiece surface only over points, see DE 34 35 313 C2. This grinding method known under the trade name "Quickpoint" enables short grinding times in conjunction with low heat development and high rotational speed of the workpiece. A reliable adjustment of the clearance angle even in a small pivoting range may be advantageous if different grinding tasks are to be managed or an existing grinding machine is not to work continuously by this method.

In all applications mentioned here, the pivotable mountings of the grinding spindles, that is to say the conventional grinding spindle units adjustable in a motor-driven manner, are at their limits. The reason for this is that these grinding spindle units are relatively bulky due to the necessary grinding accuracy and also due to the necessary pivoting device with bearings and drives. The movement of these large masses again requires large drives, such that the inertia on the whole reduces the displacement speed and the adjustment accuracy. The normal bearing of the grinding spindle units, which is sufficient for the large pivot paths when pivoting about the B-axis, is no longer sufficient for the fine adjustment in the above-mentioned cases. A highly accurate B-axis that must run without play and without friction is required. An approach for improvement could consist in forming the pivotable mounting of the grinding spindle units hydrostatically about the B-axis. This solution would be very costly however and could lead to grinding machines that are complicated to operate.

WO 2008/075020 A1 contains a proposal of adjusting a narrow grinding wheel of circular peripheral contour during operation such that its peripheral surface provided with the grinding coating is placed at different angles against the workpiece to be ground, although the position of the rotation and drive axis of the grinding wheel remains unchanged. For this purpose, the region close to the center of the narrow disk-shaped grinding-wheel central part of the grinding wheel is fixed between two securing flanges. Of these, the securing flange located on one side of the grinding wheel central part has a greater diameter than the securing flange located on the other side of the grinding wheel central part. The distribution of the rotating masses is therefore asymmetrical. When this grinding wheel is rotated, it deforms reproducibly with increasing rotational speed from a planar circular plate to the shape of a dish or a flat bowl, wherein the securing flange of greater diameter is located inwardly on the base of the bowl. Due to this deformation, the circular peripheral contour of the grinding wheel adopts an inclination; the size of the angle measured in an axial plane compared to the starting position with unmoved grinding wheel is dependent on the selected rotational speed.

The displaceable grinding wheel according to WO 2008/075020 A1 makes it possible, merely by changing the rotational speed, to grind outwardly curved bearing seats using a concavely contoured grinding coating, the axial extension of said bearing seats being broader than that of the grinding coating, without having to incline the drive shaft of the grinding wheel. Similarly, conically shaped cams of alternating direction of inclination can also be ground on a camshaft using a grinding coating that has a rectangular profile.

A disadvantage of the proposal according to WO 2008/075020 A1 is that the link between the inclination of the grinding wheel peripheral surface and the rotational speed is dependent on numerous parameters, such that an individual characteristic curve has to be created for each grinding wheel. In addition, the geometry of the grinding point influences the rotational speed actually to be set in grinding operation, wherein an amended rotational speed changes the preselected inclination unintentionally. With unequal loads, rotational speed fluctuations are also unavoidable, which may likewise influence the grinding result unfavorably. A further disadvantage may be that the rotational speed optimal for the shape-changing effect of the grinding wheels is often different from a rotational speed necessary for an optimum grinding result. In order to reconcile these two parameters at least approximately, specific purposeful changes would have to be made to the grinding wheel body, whereby a greater number of grinding wheel types is ultimately necessary.

GENERAL DESCRIPTION

One object of the present disclosure is therefore to create a device and a method of the type mentioned in the introduction, with which grinding wheels can be inclined by small angles with low inertia and with high accuracy so as to thereby achieve reliable and cost-effective grinding of curved and/or inclined workpiece contours.

The present disclosure utilizes the knowledge that a large number of materials, particularly steel-iron materials, have resilient properties to a certain extent. During a corresponding shaping process, zones of selective elastic material deformation can therefore be formed, which are to be bent outwardly in the resilient region similarly to a joint and spring back again with relief of the load. According to the present disclosure, the grinding spindle unit is connected via a material zone formed in this way to a receiving part of the grinding machine and is supported thereby. Since this zone is located close to the grinding wheel, a sufficiently long lever arm is provided over the length of the drive shaft, an adjusting unit engaging with the end of said lever arm. When this adjusting unit is activated and acts on the lever arm with an actuating or bending force, the zone of selective elastic material deformation performs its function as a joint, and the grinding spindle unit is deflected in a precisely adjustable manner, and the grinding wheel is thus inclined with respect to its starting position.

Advantageous developments of the grinding machine device according to the present disclosure are disclosed throughout. A first advantageous development of the grinding machine device according to the present disclosure consists in the fact that the zones of selective elastic material deformation have the function of a pivot axis with two hinge leaves connected thereto in the manner of a film hinge. Here, the first hinge leaf supports the grinding spindle unit whereas the second hinge leaf is connected to the receiving part.

A pivot joint is thus produced and is formed without its own, separate axis body and without bearings. The two hinge leaves and the joint axis form a one-piece component in the grinding machine device according to the present disclosure. Such a pivot joint already in principle clearly has much smaller rotating masses than the conventional grinding spindle units pivotable in a motor-driven manner that are used for pivoting about the B-axis. The pivot axis formed by the film hinge is rigid in terms of its supporting function and is without play in terms of its pivoting function. The design comes down to finding the correct balance between resilience and load-bearing capacity. With high resilience, the film hinge can be deflected in a larger angular range. However, the load-bearing capacity must not suffer as a result, rather the film hinge must also be sufficiently rigid. The correct balance is to be established via tests. The maximum angle of adjustment is also defined by the elastic limits. In practice, pivot angles between 0 degrees and 0.2 degrees are provided in the context presented here.

A specific adjusting motor is not necessary in the grinding machine device according to the present disclosure; the adjusting unit already mentioned, which for example exerts a pressure onto the deflectable part of the device, is sufficient. Since the pivotable mounting according to the present disclosure has low inertia and responds reliably, and additionally accurately maintains a deflection position selected once, the adjusting mechanism can be incorporated without difficulty into a CNC control. It is also possible, during running grinding operation, to change the inclination of the grinding wheels continuously in accordance with the selected grinding program.

A specific advantage is provided by the grinding machine device according to the present disclosure when a spherical contour, or what is known as a "ballus", is to be ground on the main bearings and pin bearings of crankshafts using narrow grinding wheels. In this case, a narrow grinding wheel with a concave grinding surface is used, wherein the axial breadth of the grinding wheel is smaller than the bearing breadth of the main bearing and/or pin bearing. This bearing breadth is defined by the crank webs. In this case it is possible to grind the entire bearing surface spherically in two plunges with different inclination of the grinding wheel. The problematic use of a formed grinding wheel which has to extend over the entire bearing breadth is thus dispensed with, as has also already been attempted with grinding wheels adjustable in terms of their axial breadth.

Furthermore, with the approach according to the present disclosure, commercially available grinding wheels can be used, and the rotational speed of the grinding wheels can be freely selected merely in accordance with grinding perspectives.

The disclosure also presents possibilities for forming the pivot axis (formed by a film hinge) of the grinding machine device constructionally as a result of the shaping at the joint position. Another possibility is that a metallene material can be metallurgically treated in zones such that a bending axis is functionally effective in the event of a deflection.

The film hinge forming the pivot axis is a one-piece component due to the principles involved. Merely from the viewpoint of function could the grinding spindle unit therefore form a one-piece construction together with its receiving part, wherein the connection is made via the pivot axis. In practice, a multi-part construction is preferred however, this being substantiated merely by manufacturing perspectives. The arrangement of a dedicated pivot axis support that contains the pivot axis and is located between the receiving part and the grinding spindle unit is therefore specified in the present disclosure. The pivot axis support is then connected both to the receiving part and to the grinding spindle unit, wherein one of these connections may also again be formed in one piece in individual cases.

The disclosure also concerns a practical exemplary embodiment. Here, a specific supporting and carrying construction is provided, which is composed of a sub-housing and a pivot axis support. The sub-housing is connected completely rigidly to the receiving part of the grinding machine, whereas the pivot axis support is only connected in part to these two however. The pivot axis, which in this case is composed of two separate pivot axes, which transition starting from the fixed part of the pivot axis support into two movable supporting arms, is formed on the pivot axis support. The grinding spindle unit screwed to the two supporting arms extends therealong. On the whole, the supporting and carrying construction supports and stiffens the entire arrangement and means that the grinding spindle unit can adopt its various pivot positions with high positional accuracy.

The disclosure is also directed to the specific formation of the adjusting unit, which, by means of a movable clamping bolt, produces a controllable distance between the grinding spindle unit and the receiving part or an intermediate component connected rigidly thereto. Due to the embodiment of the adjusting unit specified, it is possible to exclude from the adjustment process inaccuracies caused by friction or vibrations. The relevant clamping bolt thus moves over the outer ring of a needle bearing in such a way that a sliding movement between the outer ring of needle bearing and the clamping bolt is avoided. Furthermore, by means of a specific arrangement of springs, the clamping bolt effecting the adjustment is held so as to bear constantly and without free against the component on which it acts. Depending on whether the starting position of the clamping bolt is the fully inserted state or a middle position, the grinding spindle unit can be pivoted in only one direction or in two opposite directions by means of the adjusting unit.

According to one aspect of the disclosure, the receiving part, to which the grinding machine device according to the present disclosure is pivotably secured, is a grinding headstock that is movable linearly in at least one direction. At the same time, a compound rest slide movable in two directions perpendicular to one another is therefore also included. This arrangement is then implemented for example when a specific contour is to be ground on the main bearings and/or pin bearings of crankshafts in the manner already described. In this case, the grinding headstock must be moved along the crankshaft and then contacted by means of the inclined grinding wheel against the bearing to be ground.

By contrast, the disclosure also presents the possibility that the receiving part itself is already a pivot housing, which is arranged within the meaning of the known B-axis in an independently pivotable manner on a linearly movable grinding headstock such as a compound rest slide. In this case, pivoting can initially be performed over a large pivot path by means of the pivot housing, and a correction adjustment of the grinding spindle unit is then also performed via the zones of selective elastic material deformation.

Further, the disclosure is also directed to the incorporation of the pivoting of the grinding spindle unit according to the present disclosure into the CNC control of the grinding machine.

With regard to the method, the disclosure describes the development in accordance with which an independently pivotable pivot housing is combined with the selective additional pivoting of the grinding spindle unit, whereby the large pivot paths of the pivot housing are superimposed by the micro pivot paths of the grinding spindle unit relative to the pivot housing.

BRIEF DESCRIPTION OF THE DRAWINGS

The present disclosure will be explained hereinafter in greater detail on the basis of exemplary embodiments which are illustrated in the drawings. In the figures:

FIGS. 3a and 3b explain the basic principle of the present disclosure on the basis of a schematic illustration with two different pivot positions of the grinding spindle unit.

DETAILED DESCRIPTION

Figure 1:
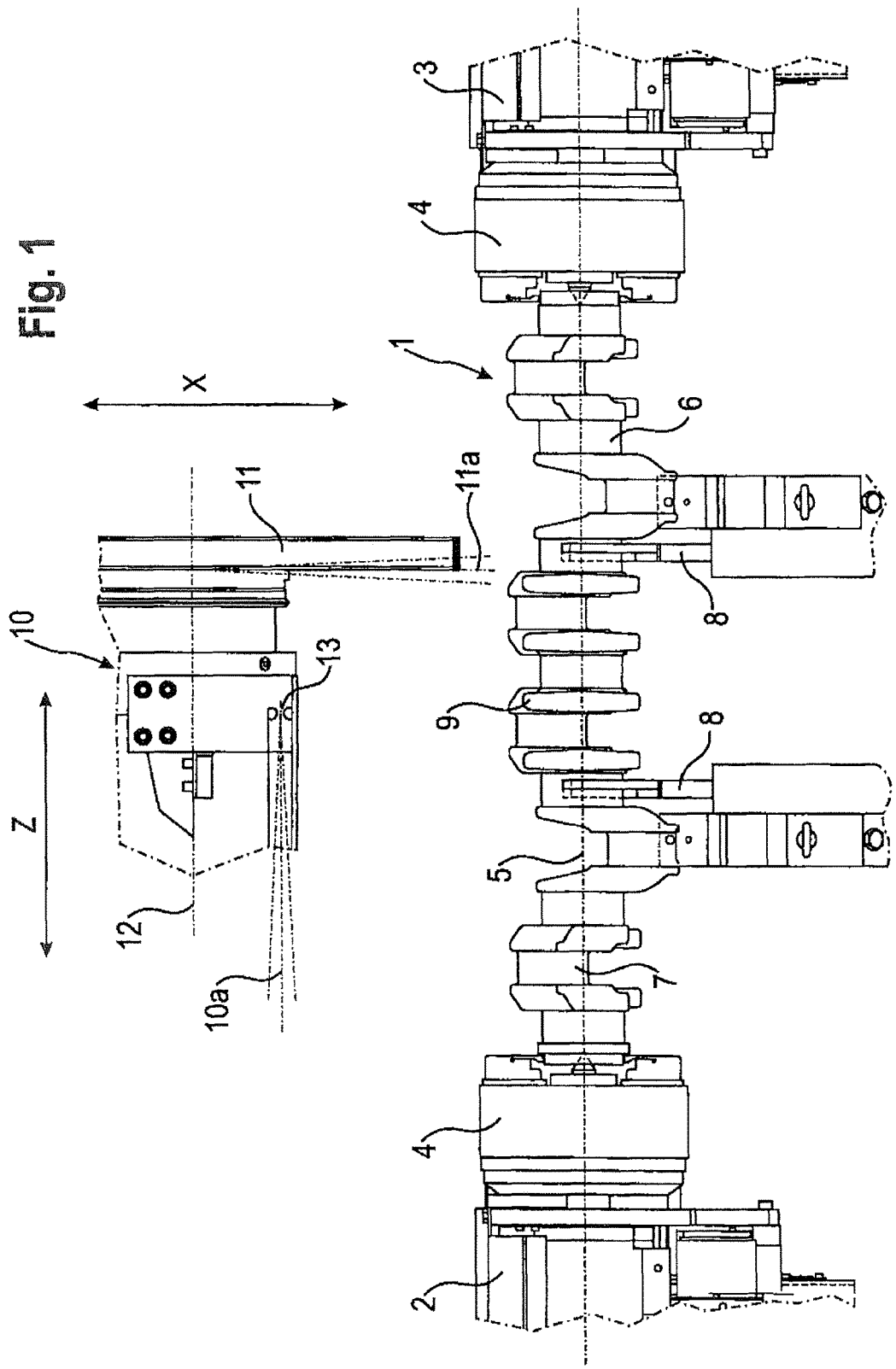
FIG. 1 shows, on the basis of the example of a crankshaft, how it is necessary in practice to adjust the rotation axis of the grinding wheel with respect to the workpiece longitudinal axis by a small angle with maximum accuracy.

In FIG. 1, the crankshaft 1 of a six-cylinder internal combustion engine is illustrated as a workpiece, which is fixed for grinding between a workpiece headstock 2 and a tailstock 3. Both stocks 2, 3 have chucks 4 with compensating chuck jaws and points; the crankshaft 1 is thus driven in rotation about its longitudinal axis 5 running through the main bearings 6. The crankshaft 1 has seven main bearings 6 and six pin bearings 7; two of the main bearings 6 are supported here via steady rests 8. Main bearings and pin bearings 6, 7 are interconnected by the crank webs 9. A grinding spindle unit 10, of which only the end region located on the side of the grinding wheel 11 is shown in FIG. 1, runs along the crankshaft 1. Reference sign 12 denotes the rotation axis of the grinding wheel 11, said rotation axis being produced from the drive shaft on which the grinding wheel 11 is secured.

The normal position with cylindrical grinding of the main bearings 6 and/or pin bearings 7 with a grinding wheel 11 of cylindrical contour initially consists in the fact that the rotation axis 12 of the grinding wheel 11 runs parallel to the longitudinal axis 5 of the crankshaft. This position of the rotation axis 12 according to FIG. 1 in this case defines the reference line. The grinding spindle unit 10 is placed here against the crankshaft 1 in the direction perpendicular to the longitudinal axis 5 of the crankshaft. In accordance with routine practice during operation, this direction is denoted by the double arrow X. In addition, the crankshaft 1 and the grinding spindle unit can be displaced relative to one another in the direction of the Z-axis, that is to say perpendicular to the X-axis. The axes X and Z define the horizontal reference plane mentioned in the introduction, as is present in the case of conventional round/unround universal grinding machines.

The grinding process in the previously mentioned normal position requires however that the main bearings 6 and/or pin bearings 7 maintain a cylindrical position and are fixed precisely in an axially parallel manner. The term "cylindrical connection" in this case also includes the fact the grinding wheel may be concave or convex at its peripheral surface. A cylinder correction is often to be performed on the workpieces to be ground however, for example due to clamping errors. In the case of crankshafts, an outwardly curved contour, that is to say a spherical peripheral surface, is often desired, of which the deviation of the cylindrical surface outwardly normally lies in a very small range of up to 5 µm. With other workpieces, such as camshafts, conical bearing points or cams, that is to say the contour of a cone, may also be requested, as well as the contour of a double cone with a maximum in the axial center.

A further problem is posed with large crankshafts: these crankshafts are relatively soft structures and, in spite of all precautions taken, are not mounted during grinding such that the center axes of the clamping and supporting elements of all main bearings 6 run precisely in line with the longitudinal axis 5 of the crankshaft 1. When grinding in the normal position, deviations from the desired contour are thus produced, and it is desirable to counteract these deviations during the grinding process by means of a deliberately controlled correction deviation from the normal position.

Figure 2A:
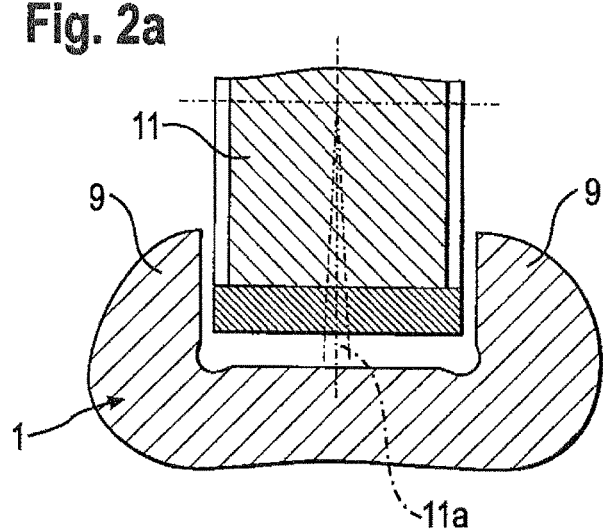
In FIGS. 2a to 2c the point of engagement provided in accordance with FIG. 1 between the grinding wheel and the workpiece is illustrated in an enlarged view.

In order to achieve these objectives, the grinding spindle unit 10 according to the present disclosure has a pivotable mounting 13, which is based on zones of selective elastic material deformation and enables a small, yet precisely adjustable inclination at least of the part of the grinding spindle unit that contains the motor-driven drive shaft with the grinding wheel 11. The dashed lines 10a and 11a in FIG. 1 indicate the extent of the desired inclination, that is to say the pivot range. FIG. 2a additionally shows the conditions with a grinding wheel 11 in the normal position. By contrast, an outwardly noticeably curved (spherical) contour with a narrow grinding wheel 11 can be achieved in accordance with FIGS. 2b and 2c when said grinding wheel is inclined (pivoted) on both sides. In this case, the grinding wheel is narrower than the bearing point to be ground.

Figure 2B:
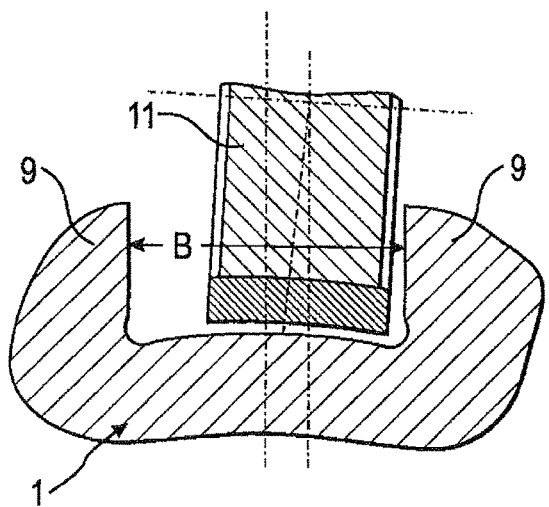
Figure 2C:
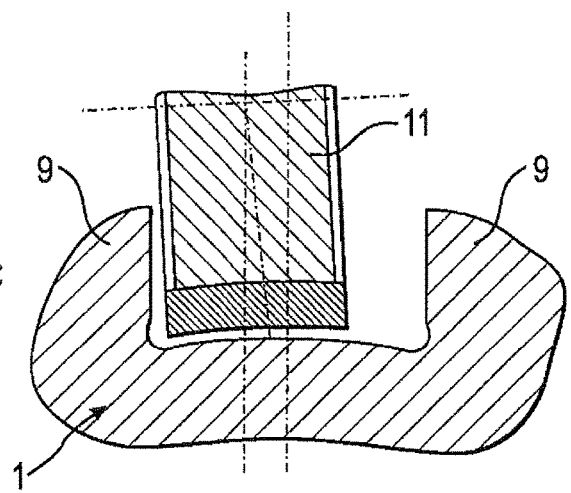

The peripheral surface (provided with the grinding coating) of the grinding wheel 11 in FIGS. 2b and 2c is concave, that is to say inwardly curved, as is necessary in the case of formed-wheel grinding. The grinding wheel 11 is much narrower than the bearing breadth B, that is to say the distance between the crank webs 9 of the crankshaft 1. Due to the small inclination of the grinding wheel 11, it is possible however to produce the curved bearing surface of the main or pin bearings, what is known as the "ballus" among practitioners, with optimum accuracy. To this end, the grinding wheel 11 is moved to and fro in a CNC-controlled manner in each direction of the X-axis and the Z-axis and at the same time pivots in the pivotable mounting 13. In addition, the approach that can be seen from FIGS. 2b and 2c offers an additional advantage when bearing points of different breadth are to be ground spherically on a crankshaft 1: a single grinding wheel type with a specific breadth is then sufficient. It is also possible however for the spherical bearing point to be ground in two separate plunges by means of the pivoting of the grinding wheel. In the case of conventional formed-wheel grinding, a different grinding wheel with adapted breadth would be necessary in this case for each bearing breadth B.

The principle of the adjusting device forming the basis of the method according to the present disclosure is explained with reference to FIGS. 3a, 3b and 4. Reference numeral 21 denotes a receiving part that belongs to the grinding machine, which is equipped with the device according to the present disclosure. For example, the receiving part 21 may be a grinding headstock, which is placed linearly against the workpiece in the direction perpendicular to the longitudinal axis 22 of the workpiece (not illustrated), that is to say in the direction of what is known as the X-axis. In addition, the receiving part 21 is linearly displaceable reciprocally in the direction parallel to the workpiece longitudinal axis 22, that is to say in what is known as the Z-axis.

A pivot axis support 23 is connected to the receiving part 21. It has the form of a one-piece plate, which is divided into two regions however by a zone of selective elastic material deformation. In the present example, the plate-shaped pivot axis support 23 consists of a metallene material, and the zone of selective elastic material deformation is achieved by a notch in the plate cross section. The notch is produced by two weakening grooves which run parallel and which run perpendicular to the horizontal reference plane formed by the X and Z-axis, as can be seen in FIGS. 3a and 3b. A joint or vertically running pivot axis 26 is thus produced in the manner of a film hinge, and the aforementioned two regions of the joint unit 13 take on the function of hinge leaves 24 and 25.

The first, shorter hinge leaf 24 is fixedly connected to the receiving part 21, as is indicated by the center line 32, which indicates a stable multiple screwed connection. The second, longer hinge leaf 25 by contrast is fixedly connected to the grinding spindle unit 27. The single connection between the grinding spindle unit 27 and the receiving part 21 is thus the material bridge, which forms the joint or the pivot axis 26 and is the only one-part component of the pivot axis support 23. The pivot axis 26 formed as a film hinge must, on the one hand, be so elastic that it is bent out in the elastic region and springs back. On the other hand, it must be stable enough that it can support the grinding spindle unit 27 and can withstand the resultant forces from the grinding process.

The grinding spindle unit 27 comprises a housing 28, which receives a drive motor indicated by 29, which may be a high-frequency motor and rotates the drive shaft 30, likewise mounted in the housing 28, about its rotation axis 30a. The direction of the rotation axis 30a runs parallel to the longitudinal axis 22 of the workpiece (not shown) according to FIG. 3a. The rotation axis 30a therefore forms the reference line for the subsequent pivoting of the grinding spindle unit 27. The grinding wheel 31 is fastened to the drive shaft 30 outside the housing 28. On the whole, the grinding spindle unit 27 extends parallel to the plate-shaped pivot axis support 23 in the position according to FIG. 3a. Here, the grinding wheel 31 is located at one end of the pivot axis support 23 in the region of the first, shorter hinge leaf 24.

At the opposite end the pivot axis support 23 and therefore also in the end region of the grinding spindle unit 27 remote from the grinding wheel 31, an adjusting unit 33 is fastened. This is connected fixedly to the second hinge leaf 25 and, as an actuation element, has a clamping bolt 34, which passes through an opening 35 in the second hinge leaf 25. As the adjusting unit 33 is controlled and actuated, the clamping bolt 34 is driven outwardly and is supported on the end face of the receiving part 21. As a result, the second hinge leaf 25 is pivoted about the vertical pivot axis 26 in the direction of a clockwise rotation (rotation arrow 36). The grinding spindle unit 27 and with it the grinding wheel 31 are thus brought into a slight, yet precisely adjustable, inclination, see the pivot angle 37 according to FIG. 3b.

There is a considerable longitudinal distance L between the pivot axis 26 and the line of action of the clamping bolt 34. The actuating force of the adjusting unit 33 thus experiences a significant intensification in order to deflect the grinding spindle unit 27. Reference numeral 38, in the form of a helical tension spring, indicates a device by means of which the contact between the clamping bolt 34 and the receiving part 21 is maintained constantly with predefined prestressing force. A predominant retraction of the clamping bolt 34 as a result of the onset of vibrations, which would lead to an inaccurate adjustment, are thus ruled out.

It is not necessary for the pivot support 23 with the pivot axis 26 to be an independent component, as is illustrated in FIGS. 3a and 3b. As is shown in FIG. 4, the joint unit 23 may also be a one-piece component of the housing 28. Only the formation of a film hinge, with which the pivot axis 26 is formed, is key. Likewise, the first, shorter hinge leaf could also be a one-piece component of the receiving part 21 in FIGS. 3a and 3b; or the receiving part 21 and the housing 28 of the grinding spindle 27 could be linked in one piece via the material bridge of the pivot axis 26. In practice, manufacturing perspectives and the necessary precision favor the selection of a multi-part construction however.

Figure 4:
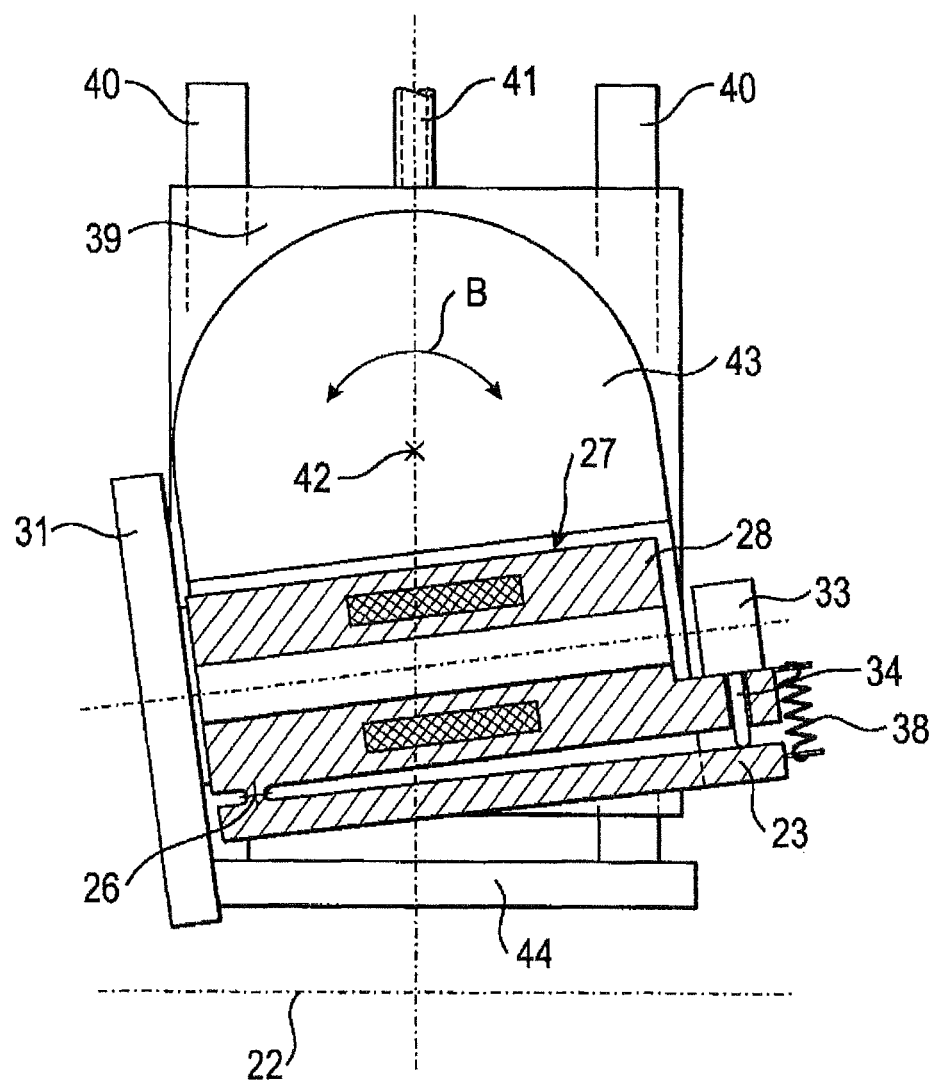
FIG. 4 shows, in a schematic illustration, how the pivoting of the grinding spindle unit according to the present disclosure can be performed additionally to the pivoting according to the prior art.

A further design is shown in FIG. 4. In this case, the receiving part is formed by a grinding headstock 39, which is moved linearly on two cylindrical guide posts 40 in a direction perpendicular to the longitudinal axis 22 of the workpiece to be ground. A threaded spindle 41, which engages in a nut arranged beneath the grinding headstock 39 is used to drive the grinding headstock 39. The transport path formed by the guide posts 40 is terminated at its front end by a bridge part 44. The horizontally running guide posts 40 and the bridge part 44 here define a horizontal reference plane, as is always defined generally by the X- and Z-axis. A vertical axis 42, which is formed by a bearing and carrying construction of the grinding headstock 39 runs perpendicular to this reference plane. Due to this bearing and carrying construction, a pivot housing 43 is supported, which is pivoted in a motor-driven manner about this vertical axis 42 in a likewise horizontal plane. The vertical axis 42 is what is known as the B-axis in practice. Viewed from above, the pivot housing 43 has the shape of a circle with an attached rectangle. In the region of this attached rectangle, the joint unit 23 is connected fixedly to the pivot housing 43.

The pivot axis support 23 supports the grinding spindle unit 27 via the pivot axis 26, which is formed as a film hinge and forms a material bridge. The pivot axis support 23 and the grinding spindle unit 27 are in this case interconnected in one piece, but are pivotable with respect to one another. The units may also be formed in a number of pieces however. Upon actuation of the adjusting unit 33, the grinding spindle unit 27 pivots again with respect to the pivot housing 43 in the manner as has already been described with reference to FIGS. 3a and 3b.

The pivot axis 26 also runs in a vertical direction. The function of the grinding machine device according to FIG. 4 is therefore readily understandable. By pivoting the pivot housing 43 about the vertical axis 42, a coarse adjustment of the grinding wheel 31 with respect to the workpiece is initially performed. As the pivot housing 43 is pivoted, the grinding spindle unit 27 is also entrained, because it is connected to the pivot housing 43 via the pivot axis 26. A fine adjustment is then performed by actuating the adjusting unit 33. The grinding spindle unit 27 then pivots with respect to the joint unit 23 and the pivot housing 43. The small, yet precisely adjustable inclination already mentioned of the grinding 31 with respect to the workpiece is thus implemented in order to achieve the necessary geometrical accuracy of the bearing point.

The embodiment according to FIG. 4 is then expedient if different faces that require a different normal position of the grinding wheel are to be ground on a workpiece, wherein a specific fine adjustment is lastly also necessary; to this end, the pivoting by means of the adjusting unit 33 is necessary. Another use of the principal illustrated in FIG. 4 is then provided when two or more grinding spindle units are arranged in a common pivot housing. Different grinding wheels can thus be used in succession.

In the embodiment according to FIGS. 3a and 3b, the grinding spindle unit and therefore also the drive shaft 30 of the grinding wheel 31 runs exactly parallel to the plate-shaped pivot axis support 23 when the adjusting unit 33 is unactuated, that is to say the clamping bolt 34 is drawn in. The joint unit 23 then bears against the end face of the receiving part 21. In this embodiment, the inclination of the grinding spindle unit 27 and of the grinding wheel 31 can always be implemented only in one direction, as is shown in FIG. 3b. In the embodiment of the joint unit of the pivot axis support 23 according to FIG. 4 by contrast, the pivot axis support 23 can be set in such a way that the parallel positioning is only produced by driving out the clamping bolt 34 over a specific region. If the clamping bolt 34 is fully inserted, an acute angle is produced between the housing 28 of the grinding spindle unit 27 and the pivot axis support 23, which is then in contact with the housing 28 in the region of the adjusting unit 33. The parallel positioning here would thus already require a specific prestressing of the pivot axis 26; for this purpose, it is possible to pivot the grinding spindle unit 27 in two different directions depending on the travel of the driven-out clamping bolt 34, specifically outwardly or inwardly starting from the parallel position.

The effective position of the clamping bolt 34 can be changed continuously during operation. If the adjusting unit 33 is incorporated into the program of the machine control, rather specific grinding contours can therefore be implemented in programmed sequence, in this regard see FIGS. 2b and 2c.

The practical exemplary embodiment according to FIG. 5 again shows two guide posts 51, which are connected by bridge parts 53 and 54 and belong to the grinding machine, which is equipped with the grinding spindle unit 55. The guide posts 51 and bridge parts 53, 54 form the reference plane for the axis directions. The reference plane will generally run horizontally. The grinding headstock 56 slides over the guide posts 51, in this regard see also the perpendicular section according to FIG. 6. The grinding headstock 56 is driven by the threaded spindle 52, which is rotated by the servomotor 57. During grinding operation, the servomotor 57 moves the grinding headstock 56 in a CNC-controlled manner in the direction of the X-axis, that is to say perpendicular to the longitudinal axis of the workpiece to be ground, which is not illustrated in FIG. 5.

A supporting and carrying construction 58 (see FIG. 7), which receives and encloses the grinding spindle unit 55, is fixedly screwed to the grinding headstock 56. The supporting and carrying construction 58 consists of a sub-housing 59 and a pivot axis support 60. The course and the borders of the sub-housing 59 and pivot axis support 60 can only be held apart from one another with effort in FIGS. 5 and 6; a clearer view is provided by the three-dimensional illustration according to FIG. 7. Due to the clearer view, the grinding spindle unit 55 is omitted in FIG. 7. In addition, all individual regions that belong to the sub-housing 59 or the pivot axis support 60 are additionally denoted in FIGS. 5 to 7 by the letters a, b, c . . . , thus providing a certain clarity. It is key that the sub-housing 59 is screwed fixedly to the grinding headstock 56, whereas the pivot axis support 60 is only screwed in a first sub-region to the sub-housing 59 and the grinding headstock 56. A second sub-region of the pivot axis support 60 is pivotable with respect to its first sub-region and therefore also with respect to the grinding headstock 56; this second sub-region is screwed fixedly to the grinding spindle unit 55.

The borders between the two sub-regions of the pivot axis support 60 form the zones of selective elastic material deformation, which are formed here again by material weakening in the form of weakening grooves. Upper pivot axes 61a and lower pivot axes 61b, which can be clearly seen in FIGS. 5 to 7 and together form the overall geometric pivot axis 61, are thus produced in the material of the pivot axis support 60. The cohesive individual regions of the pivot axis support 60 denoted in FIGS. 5 to 7 by 60a to 60f form a separate supporting construction, which is only cohesive with the first sub-region and therefore with the sub-housing 59 via the two pivot axes 61a and 61b. The grinding spindle unit 55 housed in the interior of the supporting and carrying construction 58 is screwed merely to this pivotable carrying construction. Inter alia, FIG. 7 clearly shows that, starting from the pivot axes 61, 61b, an upper bearing arm 60d, 60f and a lower bearing arm, 60c, 60e are formed and that these bearing arms 60d, 60f and 60c, 60e are connected at their ends by a bridge part 60a. The grinding spindle unit 55 not shown in FIG. 7 is fixed to these bearing arms. The grinding spindle unit 55 here too has the same structure as in the previous exemplary embodiments, that is to say a housing with a drive motor, a drive shaft and a grinding wheel 62. Only the grinding wheel 62 and its rotation axis 63 are therefore shown in FIGS. 5 and 6 and provided with reference numerals.

Figure 5:
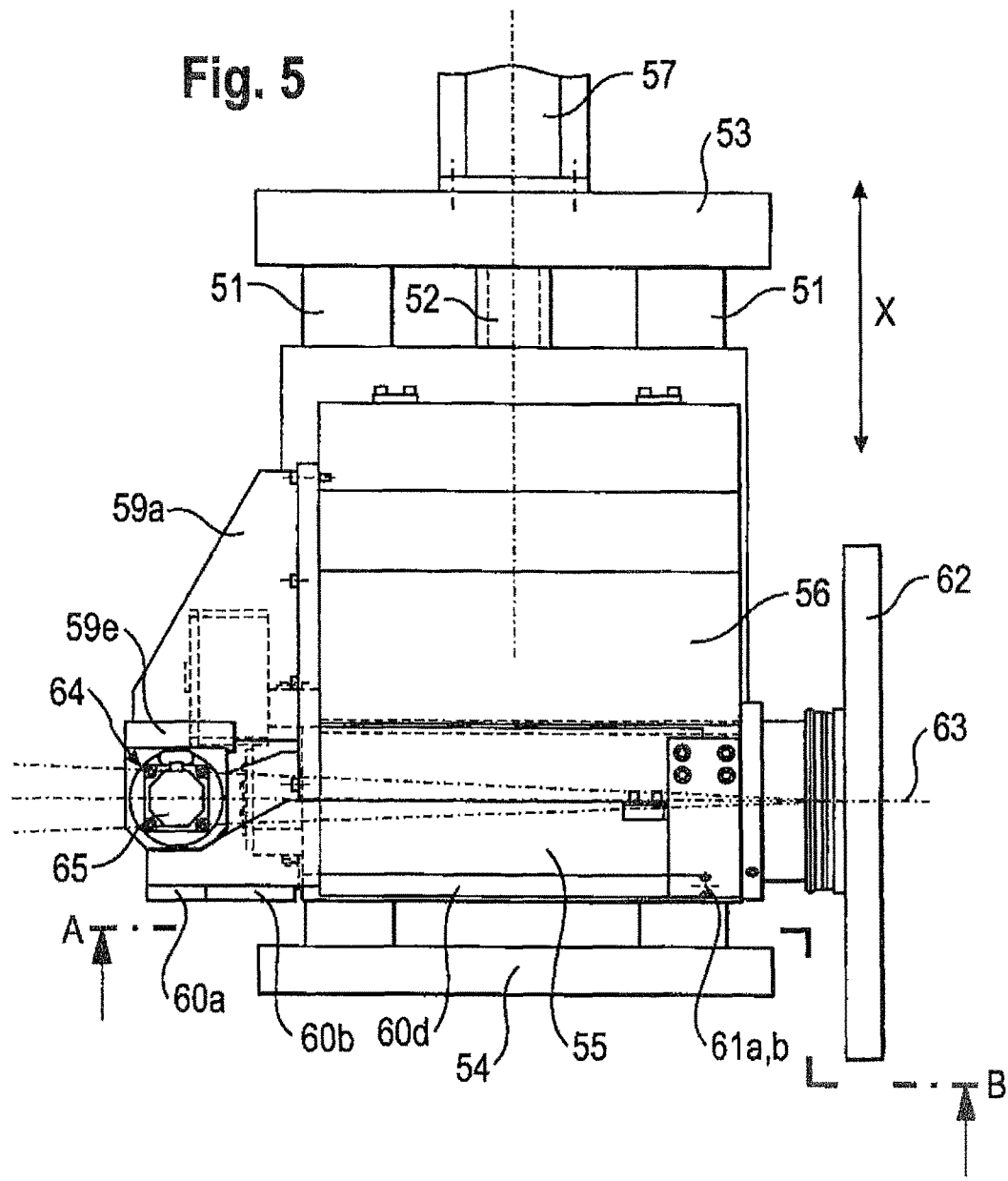
FIG. 5 shows a view from above of a practical embodiment of a grinding machine device according to the present disclosure.
Figure 6:
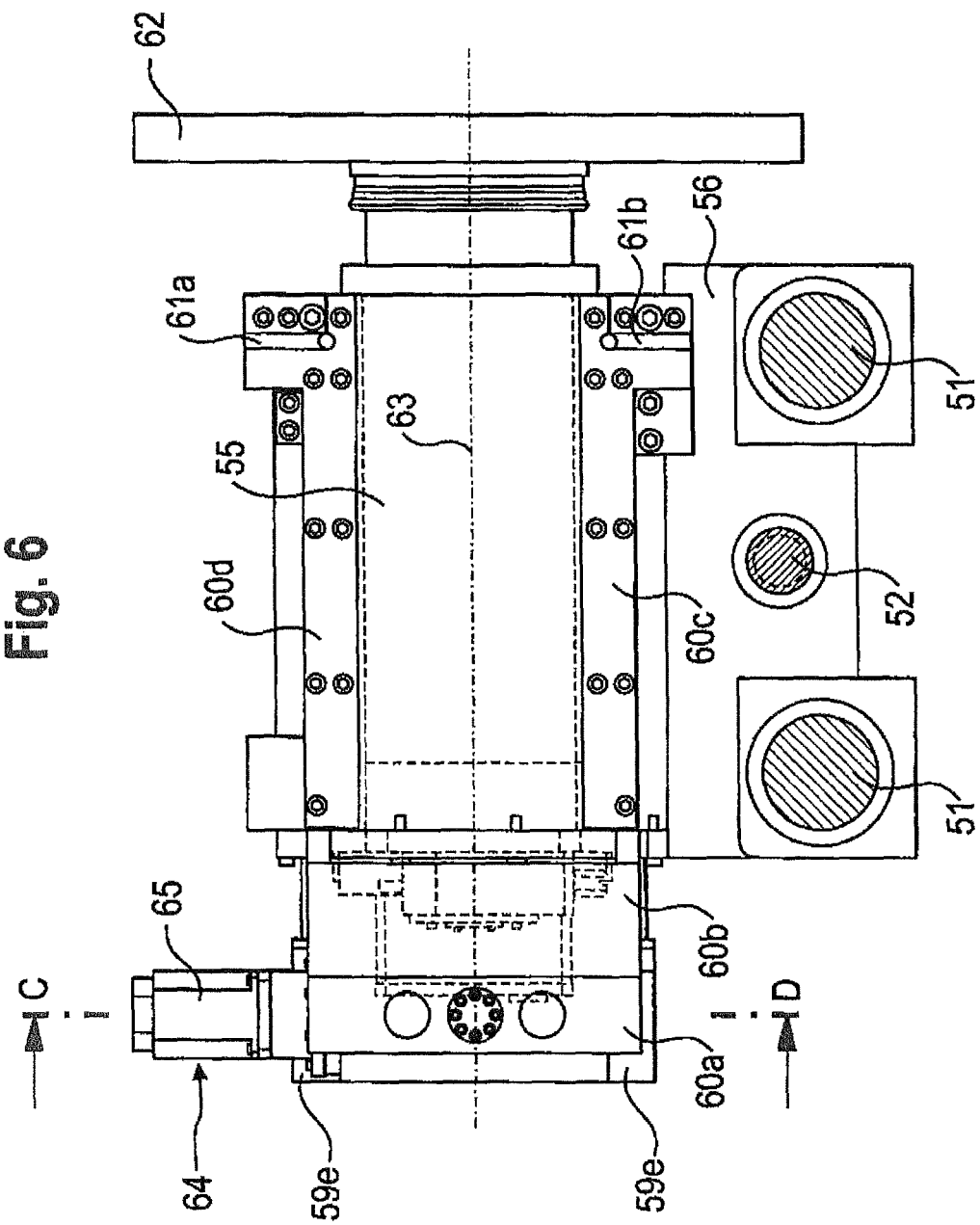
FIG. 6 shows a perpendicular partial section along the line A-B in FIG. 5.
Figure 7:
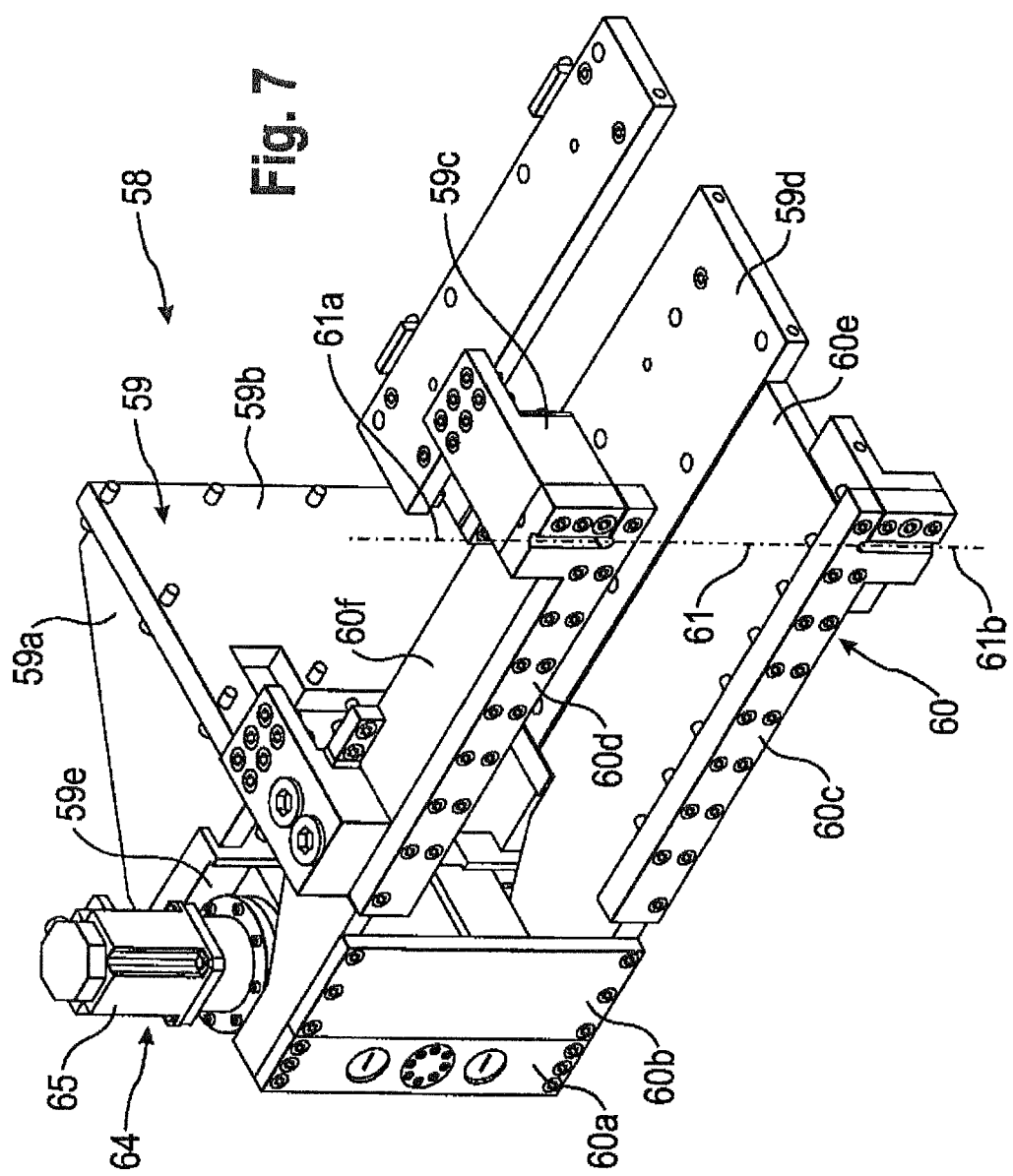
FIG. 7 contains a 3D illustration of the mounting shown in FIGS. 5 and 6 for the grinding spindle unit.
Figure 8:
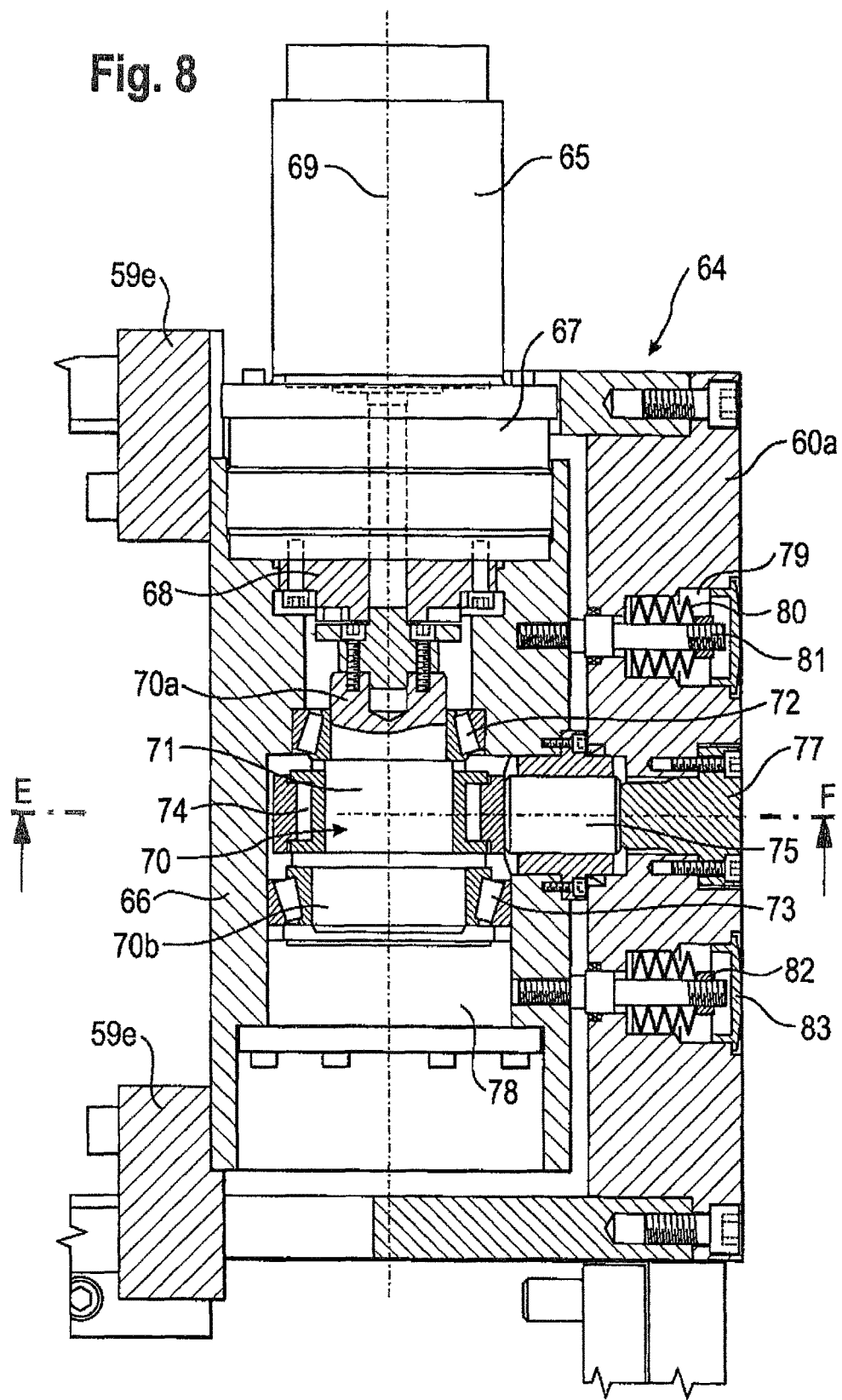
FIG. 8 explains the function of the adjusting device in a perpendicular longitudinal section corresponding to an enlarged section along the line C-D in FIG. 6.

To pivot the grinding spindle unit 55 in accordance with the exemplary embodiment according to FIGS. 5 to 7, an adjusting unit 64 is used, of which only the servomotor 65 protruding upwardly from the supporting and carrying construction 58 can basically be seen in FIGS. 5 to 7. The function of the adjusting unit 64 will be described with reference to FIGS. 8 and 9. Here, FIG. 8 is an enlarged and partly sectional illustration along the line C-D in FIG. 6. In accordance with its function, the adjusting unit 64 is arranged in the supporting and carrying construction 58 at the end opposite the grinding wheel 62 and at a point where a region 59e of the sub-housing 59, which is rigid as a whole and is fixedly connected to the grinding headstock 56, is arranged opposite an individual region 60a, distanced far from its pivot axes 61a, 61b, of the pivotable sub-region of the pivot axis support 60. FIG. 8 shows exactly this point, see to the left the fixed region 59e of the sub-housing 59 and to the right the movable individual region 60a of the pivot axis support 60.

The adjusting mechanism of the adjusting unit 64 is housed in a housing 66, which is fixedly connected to the fixed region 59e, for example is screwed thereto. The following functional parts are assembled together in the housing 66 in the direction from top to bottom with a common longitudinal and rotation axis 69: the previously mentioned servomotor 65, a reduction gear 67, a clutch 68, and a rotor actuator 70, which in the axial direction comprises two central outer portions 70a and 70b and also an eccentric middle portion 71 located therebetween. Here, the central outer portions 70a, 70b are mounted in prestressed tapered roller bearings 72 and 73 without play, said bearings being particularly well suited for taking up large forces.

The middle portion 71 of the rotor actuator 70 likewise has a circular cross section; its center axis however is arranged eccentrically with respect to the common longitudinal and rotation axis 69. The two central outer portions 70a and 70b together with the middle portion 71 form a common rotating body; the rotor actuator 70 can thus be produced in one piece. The diameter of the central outer portion 70a located on the side of the clutch 68 is smaller than the diameter of the end-face central outer portion 70b. The same is true for the tapered roller bearings 72, 73 associated with the outer portions 70a, 70b.

Figure 9:
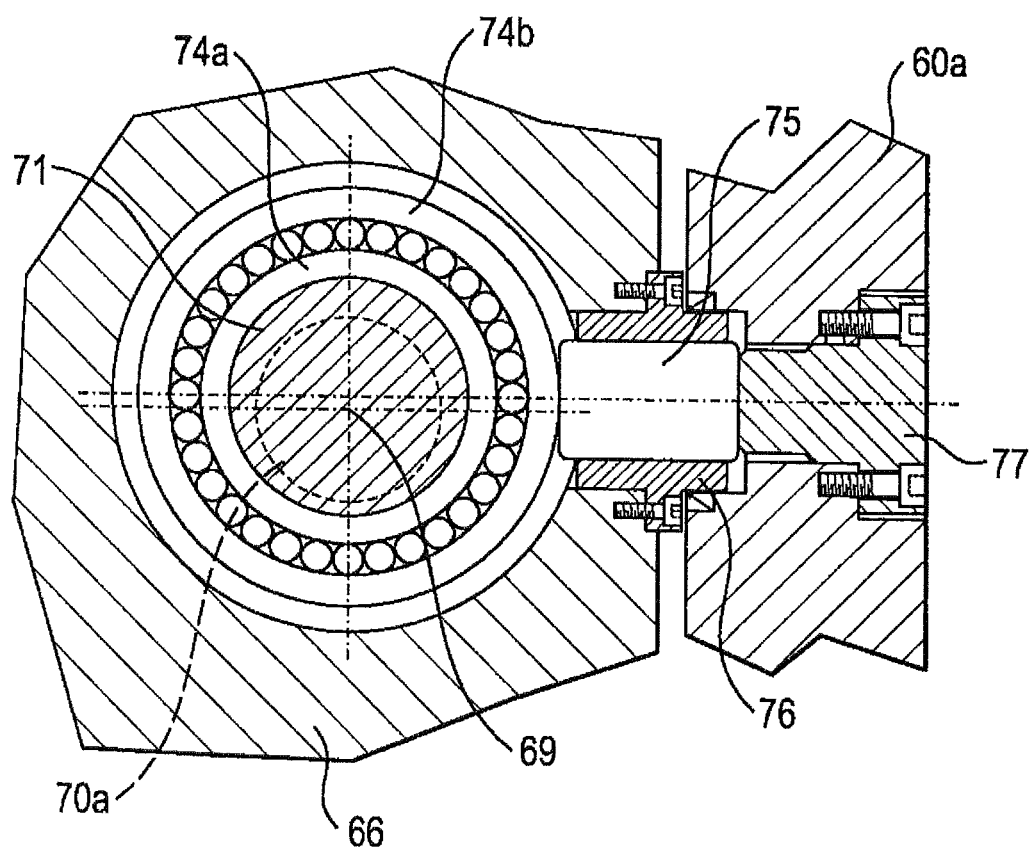
FIG. 9 shows a detail of the adjusting unit along the section E-F in FIG. 8.

The inner ring 74a of a needle bearing 74 is arranged in a rotationally engaged manner on the middle portion 71, see also FIG. 9 in this regard. The outer ring 74b of the needle bearing 74 is in contact with the first end face of a clamping bolt 75, which is guided in a longitudinally displaceable manner in a guide sleeve 76 of the housing 66. The opposite second end face of the guide bolt 74 is in constant contact with the end face of an anvil body 77, which is inserted into the movable individual region 60a of the pivot axis support 60 and is fastened therein. The anvil body 77 and the clamping bolt 75 are formed and tempered from a particularly resistant material so that they are resistant to the constant loading during adjustment of the grinding spindle unit 55. Since the anvil body 77 is inserted into the movable individual region 60a of the pivot axis support 60 from the outside and is fastened by screws, it can be easily exchanged as necessary. Reference numeral 78 denotes the housing base fixedly screwed to the housing 66.

On either side of the anvil body 77, a recess 79 is provided in each case in the individual region 60a of the pivot axis support 60 visible in FIG. 8 and receives a group of disk springs 80. The disk springs 80 are penetrated centrally by tie rods 81, which are screwed into the wall of the housing 66 and are prestressed by clamping nuts 82. The two units formed of disk springs 80, tie rods 81 and clamping nuts 82 form a pair of clamping devices, which hold the clamping bolt 75 so as to be bearing constantly against the pivotable sub-region of the pivot axis support 60. Protective caps 83 attached externally cover the clamping devices outwardly and thus prevent soiling during the grinding process.

The described adjusting unit 64 functions as follows: When the servomotor 65 is actuated and is moved, it drives the rotor actuator 70 in rotation with a considerable torque via the reduction gear 67 and the clutch 68. The eccentric middle portion 71 of the rotor actuator 70 has to rotate together with the fitted inner ring 74a of the needle bearing 74 and thus urge the outer ring 74b outwardly. The outer ring 74b therefore shifts the clamping bolt 75 in its guide sleeve 76 in a direction that runs perpendicular, that is to say radially, to the longitudinal and rotation axis 69. In so doing, the outer ring 74b of the needle bearing 74 experiences merely a displacement movement without rotating. This means that there is no friction-induced transverse movement between the outer ring 74b and the end face of the clamping bolt 75. This leads to a very exact conversion of the rotational movement of the rotor actuator 70 into the linear actuating movement of the clamping bolt 75. The clamping bolt 75 transmits the displacement with a high level of accuracy to the anvil body 77 and therefore to the pivotable sub-region of the pivot axis support 60, to which the grinding spindle unit 55 is fastened exclusively. It must also be remembered that the referencing of the "individual regions" 59a, b, c . . . and 60 a, b, c . . . only serves to facilitate the understanding of FIGS. 5 to 7, which are slightly unclear, but that the sub-housing 59 and the pivot axis support 60 of course together form the single structure of the supporting and carrying construction 58. In terms of function, in the case of the pivot axis support 60, a distinction is then to be made merely between a fixed sub-region connected to the sub-housing 59 and the grinding headstock 56, and a second sub-region, which is pivotable with respect to the first sub-region about the pivot axes 61a, 61b.

The invention claimed is:

1. A grinding machine device with a grinding spindle unit, which has a motor-driven drive shaft mounted therein and a grinding wheel fastened to one end thereof, and with a pivotable mounting of the grinding spindle unit on a receiving part of the grinding machine, wherein, due to the pivotable mounting, different inclinations of the drive shaft with respect to a reference line are set, wherein
 a) the grinding spindle unit is connected via zones of selective elastic material deformation to the receiving part and is supported thereby;
 b) the zones of selective elastic material deformation are located in the first end region of the drive shaft facing toward the grinding wheel;
 c) an adjusting unit, which, upon activation, exerts an actuating force acting on the grinding spindle unit, which is directed transverse to the longitudinal axis of the drive shaft and of which the inclination is controlled via the zones of selected elastic material deformation, is located in the second end region of the drive shaft opposite the grinding wheel.

2. The grinding machine device as claimed in claim 1, wherein the zones of selective elastic material deformation have the function of a pivot axis with two hinge leaves connected thereto in the manner of a film hinge, wherein the first hinge leaf supports the grinding spindle unit and the second hinge leaf is connected to the receiving part.

3. The grinding machine device as claimed in claim 2, wherein the pivot axis is formed in a construction-inherent manner by one or more zones of locally selective weakening or deformation.

4. The grinding machine device as claimed in claim 3, wherein the pivot axis is defined by at least one longitudinal groove, which extends at a connection point between the grinding spindle unit and receiving part along the pivot axis and is excluded in the material of the connection point.

5. The grinding machine device as claimed in claim 2, wherein the zones of selective elastic material deformation consist of a metallic material and the pivot axis is formed by a local treatment of the structure of the material.

6. The grinding machine device as claimed in claim 2, wherein that the pivot axis is formed on a pivot axis support which is located between the receiving part and the grinding spindle unit and is connected thereto.

7. The grinding machine device as claimed in claim 6, wherein the pivot axis support is a component of a supporting and carrying construction receiving and stiffening the grinding spindle unit.

8. The grinding machine device as claimed in claim 7, wherein the pivot axis support is connected via a sub-housing to the receiving part of the grinding machine and is connected via two parallel supporting arms to the grinding spindle unit, wherein the two supporting arms extend along the grinding spindle unit and, over portions, each have a pivot axis forming the overall pivot axis.

9. The grinding machine device as claimed in claim 1, wherein the adjusting unit is effective by means of a movable clamping bolt, which in the activated state, by a means of mechanical contact, produces a controllable spacing between the grinding spindle unit and the receiving part or an intermediate component connected rigidly thereto and thus pivots the grinding spindle unit.

10. The grinding machine device as claimed in claim 6, wherein the adjusting unit is fastened to the sub-housing and the movable clamping bolt bears against a bridge part, which interconnects the ends of the two supporting arms that can be pivoted out.

11. The grinding machine device as claimed in claim 9, wherein the following features are provided:
 a) a rotor actuator is mounted in a housing of the adjusting unit and, upon actuation by a servomotor, experiences an angular displacement about its longitudinal and rotation axis;
 b) the rotor actuator has an eccentric middle portion, which supports the inner ring of a needle bearing in a rotationally engaged manner;
 c) the outer ring of the needle bearing is in contact with the clamping bolt, which is slidable in the direction redial to the longitudinal and rotation axis of the rotor actuator;
 d) the adjusting unit is arranged at a point of the grinding machine device in which a first component to be assigned statically to the receiving part is arranged opposite a second component movable with respect to the first component by means of the pivot axis, wherein the housing of the adjusting unit is fixedly connected to one component and the clamping bolt is held by springs so as to bear constantly against the other component without play.

12. The grinding machine device as claimed in claim 1, wherein the receiving part is a grinding headstock movable linearly at least in one direction.

13. The grinding machine device as claimed in claim 1, wherein the receiving part is a pivot housing that itself is arranged pivotably about a pivot axis on a grinding headstock movable linearly at least in one direction, wherein the pivot axis is directed perpendicular to the movement plane of the grinding headstock in such a way that, in addition to the large pivot range of the pivot housing, a correction adjustment can be implemented via the zones of selective elastic material deformation.

14. The grinding machine device as claimed in claim 2, wherein in a case of a grinding machine with CNC control, the grinding spindle unit is pivoted during the grinding process and is incorporated into the CNC control.

* * * * *